United States Patent
Katayama et al.

(10) Patent No.: US 6,602,565 B1
(45) Date of Patent: Aug. 5, 2003

(54) METHOD OF PRODUCING FUEL HOSE AND FUEL HOSE OBTAINED THEREBY

(75) Inventors: Kazutaka Katayama, Komaki (JP); Hiroaki Ito, Kasugai (JP); Takahiro Nishiyama, Kasugai (JP); Koyo Murakami, Nagoya (JP); Tomonori Hayakawa, Tokai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/369,357

(22) Filed: Aug. 6, 1999

(30) Foreign Application Priority Data

Aug. 10, 1998 (JP) ............................. 10-225087
Aug. 10, 1998 (JP) ............................. 10-225088

(51) Int. Cl.[7] .......................... B29K 77/00; B29K 85/00
(52) U.S. Cl. .................. 428/35.7; 138/137; 138/138; 428/36.6; 428/36.7; 428/36.91; 428/421; 428/447; 428/448; 428/451; 428/475.8; 428/476.1
(58) Field of Search ................. 138/137, 138; 428/35.7, 36.2, 36.7, 36.91, 475.8, 176.1, 421, 447, 448, 451

(56) References Cited

U.S. PATENT DOCUMENTS

| | | | |
|---|---|---|---|
| 4,735,996 A | 4/1988 | Nagai et al. | 525/326 |
| 5,500,257 A | 3/1996 | Krause et al. | 427/487 |
| 5,554,425 A | 9/1996 | Krause et al. | 428/36.91 |
| 5,665,444 A * | 9/1997 | Eguchi et al. | 428/36.91 |
| 5,718,957 A | 2/1998 | Yokoe et al. | 428/36.91 |
| 5,919,326 A * | 7/1999 | Yokoe et al. | 156/244.13 |
| 5,931,201 A * | 8/1999 | Hsich | 138/137 |

FOREIGN PATENT DOCUMENTS

| | | |
|---|---|---|
| EP | 0 479 592 A2 | 4/1992 |
| EP | 0 551 094 A1 | 7/1993 |
| EP | 0 676 276 A1 | 10/1995 |
| EP | 0 829 507 A2 | 3/1998 |
| JP | 01154755 A * | 6/1989 |
| JP | 2900739 | 8/1994 |
| JP | 6-286079 | 10/1994 |
| JP | 2820003 | 4/1995 |
| JP | 7-178875 | 7/1995 |
| JP | 8-118546 | 5/1996 |
| JP | 10-30761 | 2/1998 |
| JP | 10-30764 | 2/1998 |
| JP | 10-030760 | 2/1998 |
| JP | 10030764 | 2/1998 |
| JP | 10030765 | 2/1998 |
| WO | WO 95/23036 | 8/1995 |

* cited by examiner

Primary Examiner—Sandra M. Nolan
(74) Attorney, Agent, or Firm—Armstrong, Westerman & Hattori, LLP

(57) ABSTRACT

A method of producing a fuel hose having superior adhesive reliability with superior initial adhesive strength between a tubular fluororesin inner layer and a thermoplastic resin outer layer and with restrained deterioration in adhesive strength after heat aging and immersion into fuel under severe conditions such as an inside of an engine compartment. The method includes plasma treatment on a peripheral surface of the tubular fluororesin inner layer, at least one treatment of water treatment and silane coupling agent treatment on the plasma treated surface and formation of the thermoplastic resin outer layer on the treated peripheral surface.

8 Claims, 11 Drawing Sheets

BOND ENERGY (eV)

METHOD OF PRODUCING FUEL HOSE AND FUEL HOSE OBTAINED THEREBY

FIELD OF THE INVENTION

The present invention relates to a method of producing a fuel hose for use in a fuel system of a motor vehicle or other equipment and a fuel hose obtained thereby.

PRIOR ART

Generally, fuel hoses used in fuel systems of cars and other equipment have multi-layer structures comprising various rubber and resin layers. Among such multi-layer fuel hoses, a two-layer fuel hose comprising a fluororesin inner layer and a thermoplastic resin outer layer laminated on a peripheral surface of the inner layer is in prevalent use. Since a fluororesin is superior not only in corrosion resistance and impermeability to chemicals, gasoline and the like but also in resistance to sour gasoline which is produced by oxidation of gasoline (sour gasoline resistance), a fluororesin is generally regarded as the optimal material for forming an inner layer of a fuel hose which is directly exposed to fuel. The thermoplastic resin outer resin layer is provided as a reinforcing member of the hose for imparting pressure resistance and other dynamic characteristics to the fuel hose.

However, since the fluororesin for forming the inner layer of the hose has very little adhesiveness for other structural materials, there is a problem caused that adhesive strength between the fluororesin inner layer and the thermoplastic resin outer layer is extremely low even if the two layers are adhered by an adhesive. Proposed as one approach for solving the aforesaid problem is a fuel hose comprising a fluororesin inner layer with its surface modified with treatment such as corona discharge (high-frequency treatment) and a thermoplastic resin outer layer formed on the surface-treated fluororesin inner layer. Such a hose is commercially available for use as a fuel hose for cars and the like, for example, as a fuel hose of a gasoline tank.

However, such a fuel hose surface-modified by corona discharge or the like does not have a sufficient initial adhesive strength between the fluororesin inner layer and the thermoplastic resin outer layer. For this reason, when the above-mentioned fuel hose is used under severe conditions such as an inside of an engine compartment, the hose is directly subject to effects due to a temperature rise in the atmosphere, engine vibration and the like so that the adhesive strength between the fluororesin inner layer and the thermoplastic resin outer layer remarkably deteriorates after heat aging and immersion into fuel, resulting in a problem of inferiority in adhesive reliability.

In view of the foregoing, it is an object of the present invention to provide a method of producing a fuel hose which is superior in an initial adhesive strength between a fluororesin inner layer and a thermoplastic resin outer layer and can restrain deterioration in adhesive strength after heat aging and immersion into fuel under severe conditions such as an inside of an engine compartment, resulting in adhesive reliability, and a fuel hose produced thereby.

In accordance with a first aspect of the present invention, there is provided a method of producing a fuel hose comprising plasma-treating a surface of a tubular fluororesin inner layer, treating a surface layer of the plasma-treated peripheral surface with at least one of water and a silane coupling agent aqueous solution and forming a thermoplastic resin outer layer on the treated peripheral surface. In accordance with a second aspect of the present invention, there is provided a fuel hose produced by the above-mentioned method.

SUMMARY OF THE INVENTION,

The inventors of the present invention already have found that adhesive strength between the tubular fluororesin inner layer and the thermoplastic resin outer layer was improved by plasma-treating a surface of the tubular fluororesin inner layer so that superior initial adhesive strength can be obtained. This is because fluorine atoms and hydrogen atoms are set free from molecules of the fluororesin by the plasma treatment so as to produce carbon radicals, which react with the atmosphere so as to produce adhesive functional groups, the surface concentration of fluorine atoms decreases by defluorination, and the plasma-treated peripheral surface becomes uneven. As a result of further researches on the plasma-treated fuel hose, the inventors found that the surface concentration of fluorine atoms is still high on the peripheral surface of the tubular fluororesin inner layer and functional groups having fluorine atoms not involved in adhesion are widely distributed therein by conducting plasma treatment only so that adhesive strength between the tubular fluororesin inner layer and, the thermoplastic resin outer layer is insufficient. As a result of still further researches, the inventors found that the functional groups having fluorine atoms not involved in adhesion go inside the tubular fluororesin inner layer by conducting at least one of water treatment and silane coupling agent aqueous solution treatment on the plasma-treated peripheral surface so that the surface concentration of fluorine atoms decreases on the peripheral surface of the tubular fluororesin inner layer and the distribution of the functional groups having fluorine atoms not involved in adhesion decreases while adhesive functional groups (functional groups having oxygen atoms) such as an OH group widely distribute therein. As a result, the inventors found that adhesive strength between the tubular fluororesin inner layer and the thermoplastic resin outer layer is improved by conducting the at least one of water treatment and silane coupling agent aqueous solution treatment on the plasma-treated peripheral surface. As a result, a fuel hose superior in adhesive reliability can be obtained since deterioration in adhesive strength after heat aging and immersion into fuel can be restrained under severe conditions such as an inside of an engine compartment. Thus, the inventors have attained the present invention. Especially, in the case that silane coupling agent aqueous solution treatment is conducted on the plasma-treated peripheral surface, a silane coupling agent layer can be formed on a surface of the tubular fluororesin inner layer so that each adhesive strength between the tubular fluororesin inner layer and the silane coupling agent layer and between the silane coupling agent layer, and the thermoplastic resin outer layer is further improved, respectively.

Where the water treatment is conducted by using an aqueous acid solution, sufficient adhesive strength after heat aging and immersion into fuel can be obtained so that a fuel hose further superior in adhesive reliability can be produced. Where a hydrogen exponent (pH) of the aqueous acid solution is 2 to 6, a fuel hose even further superior in adhesive reliability can be produced.

Where the silane coupling agent is an amino silane coupling agent represented by the following general formula (1), stability of the silane coupling agent aqueous solution is good.

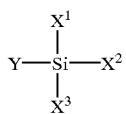

(1)

wherein Y is $NH_2(CH_2)_n-$, $NH_2(CH_2)_nNH(CH_2)_m-$ or $NH_2CONH(H_2)_n-$, wherein n and m are 0 to 5, respectively, $X^1$, $X^2$ and $X^3$, which are the same or different, are $-CH_3$, $-OCH_3$, $-OC_2H_5$ or $-OC_2H_4OCH_3$, respectively, wherein at least two of $X^1$, $X^2$ and $X^3$ are $-OCH_3$, $-OC_2H_5$ or $-OC_2H_4OCH_3$.

Where the concentration of the silane coupling agent is not more than 10% by weight of a total amount of the aqueous solution, it becomes easy to treat the plasma-treated peripheral surface therewith.

Where a hydrogen exponent (pE) of the acid silane coupling agent aqueous solution is 2 to 6, sufficient adhesive strength after heat aging and immersion into fuel can be obtained, resulting in superior adhesive reliability.

Where the silane coupling agent is an epoxy silane coupling agent represented by the following general formula (2), stability of the silane coupling agent aqueous acid solution is improved.

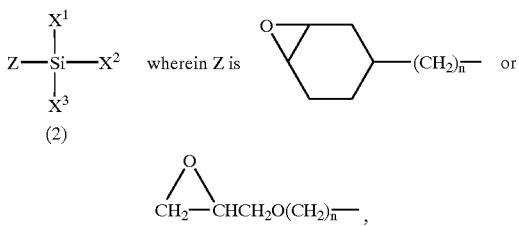

(2)

wherein n is 0 to 5, $X^1$, $X^2$ and $X^3$, which are the same or different, are $-CH_3$, $-OCH_3$, $-OC_2H_5$ or $-OC_2H_4OCH_3$, respectively, wherein at least two of $X^1$, $X^2$ and $X^3$ are $-OCH_3$, $-OC_2H_5$ or $-OC_2H_4OCH_3$.

Where the concentration of the silane coupling agent is not more than 10% by weight of a total amount of the aqueous acid solution, it becomes easy to treat the plasma-treated peripheral surface with the silane coupling agent.

DETAILED DESCRIPTION OF THE INVENTION

The present invention will hereinafter be described in detail by way of embodiments thereof.

Figure 1:
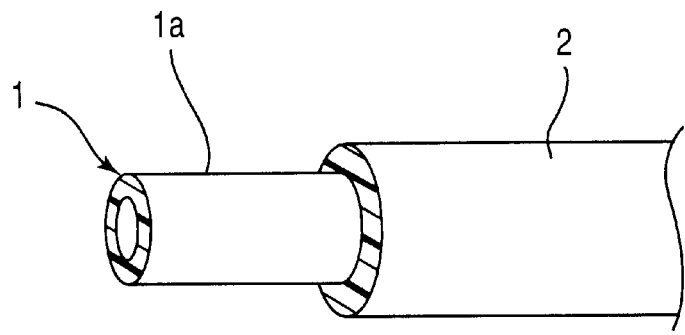
FIG. 1 is a view illustrating the structure of one embodiment of a fuel hose according to the present invention.

The fuel hose of the present invention comprises a tubular fluororesin inner layer 1 and a thermoplastic resin outer layer 2 formed on a peripheral surface of the tubular fluororesin inner layer 1, as shown in FIG. 1. The main feature of the present invention is that a peripheral surface 1a of the tubular fluororesin inner layer 1 is plasma-treated and further at least one of water treatment and silane coupling agent aqueous solution treatment is conducted thereon.

The fluororesin for forming the tubular fluororesin inner layer 1 is not particularly limited. Exemplary materials include an ethylene-tetrafluoroethylene copolymer (ETFE), polyvinylidene fluoride (PVDF), polychlorotrifluoroethylene (CTFE), an ethylene-chlorotrifluoroethylene copolymer (ECTFE), a hexafluoropropylene-tetrafluoroathylene copolymer (FEP), polytetrafluoroethylene (PTFE), a tetrafluoroethylene-perfluoroalkylvinylether copolymer (PFA), a tetrafluoroethylene-hexafluoropropylene-perfluoroalkoxyethylene terpolymer, a vinylidene fluoride-tetrafluoroethylene copolymer, a vinylidene fluoride-hexafluoropropylene copolymer, a tetrafluoroethylene-hexafluoropropylene-vinylidene fluoride terpolymer (THV). These may be used either alone or in combination thereof. Among all, ETFE, PVDF and THV are preferred from a viewpoint of high impermeability to gasoline and moldability.

It is preferred to add a conductive agent to the fluororesin to dissipate static electricity generated as a fuel (such as gasoline) flows down the hose. Examples thereof include carbon black and finely divided stainless steel filaments. The proportion of the conductive agent is preferably within a range of 0.5 to 30 parts by weight (hereinafter, abbreviated to parts) relative to 100 parts of fluororesin. Where the proportion is within the above range, volume resistivity of the tubular fluororesin inner layer 1 is not more than $10^{10}$ φ·cm so that the static electricity can be discharged from the hose. As a result, accidents such as ignition of the fuel by the accumulated static electricity can be reduced.

For improved physical properties, fillers can appropriately be added to the fluororesin. Examples thereof include titanium dioxide, barium sulfate, calcium carbonate, silica, carbon black, magnesium silicate, aluminum silicate, zinc oxide, alumina, calcium sulfate, aluminum sulfate, calcium hydroxide, aluminum hydroxide, talc, molybdenum dioxide, whiskers, short staple fibers, graphite and metallic powder. These may be used either alone or in combination thereof. The proportion of the filler is preferably not more than 30 parts relative to 100 parts of the fluororesin.

The method of plasma-treating the surface of the tubular fluororesin inner layer 1 is not particularly limited. Examples thereof include vacuum plasma treatment wherein the surface is exposed to a plasma atmosphere generated by gas-introduction for electrical discharge into a chamber maintained at a vacuum or reduced pressure and application of high-frequency. Another example is atmospheric plasma treatment wherein the surface is exposed to a plasma atmosphere generated by gas-introduction for electrical discharge into a chamber maintained at an atmospheric pressure and application of high-frequency. Among all, the vacuum plasma treatment is preferred because uniform treatment can be easily obtained. As the electric discharge gas, it is preferred to use a gas containing Ar. Examples of the gas containing Ar include Ar gas alone and a mixed gas of Ar and $N_2$, $H_2$, $O_2$ or the like. Where the mixed gas is used, it is preferred that the proportion of the Ar gas is not less than 50% by volume of the total mixed gas.

It is preferred that water excluding metal ions is used for the water treatment on the plasma-treated peripheral surface. Examples thereof include pure water (pH=7). Especially, it is preferred to use an aqueous acid solution wherein acetic acid, formic acid, hydrochloric, acid, phenol or the like is diluted with water. It is preferred that a hydrogen exponent (pH) of the aqueous acid solution is 2 to 6.

The method of the water treatment is not particularly limited. Examples thereof include a water-dripping method, a water-atomizing method, a method by applying water with a brush or a spray, a dipping-in-water method, a method by scattering water using an ultrasonic oscillator, and a method by introduction into a high-temperature and high-humidity vessel with saturated vapor.

Examples of the silane coupling agent aqueous solution for the method of the treatment using the same on the plasma-treated peripheral surface include a dilution of silane coupling agent with later (such as pure water) and a dilution of silane coupling agent with an aqueous acid solution (such as an acetic aqueous acid solution). It is preferred that the hydrogen exponent (pH) of the silane coupling agent aqueous solution is 2 to 6.

The silane coupling agent is not particularly limited, but is preferably an amino silane coupling agent represented by the following general formula (1) due to its stability in an aqueous solution in the case that it is dissolved, in water.

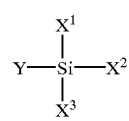

(1)

wherein Y is $NH_2(CH_2)_n-$, $NH_2(CH_2)_nNH(CH_2)_m-$ or $NH_2CONH(CH_2)_n-$, wherein n and m are 0 to 5, respectively $X^1$, $X^2$ and $X^3$, which are the same or different, are $-CH_3$, $-OCH_3$, $-OC_2H_5$ or $-OC_2H_4OCH_3$, respectively, wherein at least two of $X^1$, $X^2$ and $X^3$ are $-OCH_3$, $-OC_2H_5$ or $-OC_2H_4OCH_5$.

Among, the amino silane coupling agents represented by the general formula (1), N-β (aminoethyl) γ-amino propylmethyldimethbxysilane, N-β (aminoethyl) γ-aminopropyltriethoxysilane, γ-aminopropyltrimethoxysilane, γ-aminopropyltriethoxysilane are especially preferred.

An epoxy silane coupling agent represented by the following general formula (2) is preferred due to its stability in an aqueous acid solution in the case that it is dissolved in the aqueous acid solution.

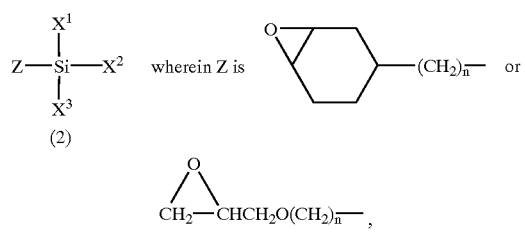

(2)

wherein n is 0 to 5, $X^1$, $X^2$ and $X^3$, which are the same or different, are $-CH_3$, $-OCH_3$, $-OC_2H_5$ or $-OC_2H_4OCH_3$, respectively, wherein at least two of $X^1$, $X^2$ and $X^3$ are $-OCH_3$, $-OC_2H_5$ or $-OC_2H_4OCH_3$.

Among the epoxy silane coupling agents represented by the general formula (2), β—(3.4-epoxycyclohexyl) ethyltrimethoxysilane and γ-glycidoxypropyltrimethoxysilane are especially preferred.

The concentration of the silane coupling agent is preferably not more than 10% by weight of the total aqueous solution, more preferably not more than 5% by weight. If the concentration exceeds 10% by weight, gelation may occur in the aqueous solution so that uniform application may not be realized. In addition, the concentration of the silane coupling agent in the aqueous acid solution is preferably within the above-mentioned range.

The method of the treatment using the silane coupling agent aqueous solution or the silane coupling agent aqueous acid solution is not particularly limited as long as the aqueous solution can be applied uniformly on the plasma-treated peripheral surface. Examples thereof include and a method of dripping the aqueous solution, a method of atomizing it, a method by applying it with a brush or a spray, a method of dipping therein, and a method by scattering it using an ultrasonic oscillator.

The amount of the silane coupling agent (excluding solvent) to be applied is preferably within a range of $1 \times 10^{-9}$ to $1 \times 10^{-4}$ g/cm$^2$, more preferably within a range of $1 \times 10^{-8}$ to $1 \times 10^{-5}$ g/cm$^2$ to the surface layer of 1 cm$^2$ of the plasma-treated peripheral surface of the tubular fluororesin in inner layer 1. The amount less than $1 \times 10^{-9}$ g/cm$^2$ is too small so that adhesive strength between the tubular fluororesin inner layer 1 and the thermoplastic resin outer layer 2 is inferior, while the amount greater than $1 \times 10^{-4}$ g/cm$^2$ is too much so that foaming occurs on the thermoplastic resin outer layer 2.

To impart structural strength to the fuel hose, the thermoplastic resin outer layer 2 is formed onto the peripheral surface 1a of the tubular fluororesin inner layer 1 treated with plasma and at least one of water and silane coupling agent aqueous solution. The thermoplastic resin for forming the thermoplastic resin outer layer 2 is not particularly limited. Examples thereof include polyester resins such as a polyamide resin and polybuthylene terephthalate (PBT), a urethane resin, a polyolefin resin and modified resins thereof. These may be used either alone .or in combination. Among all, a polyamide resin is preferred due to their superiority in heat resistance and hydrolyzability. Examples of the polyamide resin include nylon 6, nylon 66, nylon 11 and nylon 12, among which nylon 11 and nylon 12 are especially preferred due to their superiority in moldability and resistance to antifreezing agents.

It is preferred to add a conductive agent to the thermoplastic resin to impart conductivity to the thermoplastic resin outer layer 2. The kind and the proportion of the conductive agent are the same as those of the tubular fluororesin inner layer 1 as described above.

For improved processability and flexibility, a plasticizer may be added to the thermoplastic resin, as required. Examples thereof include sulfonamides and hydroxybenzoic esters. The proportion of the plasticizer is preferably not more than 20 parts relative to 100 parts of the thermoplastic resin.

Figure 2:
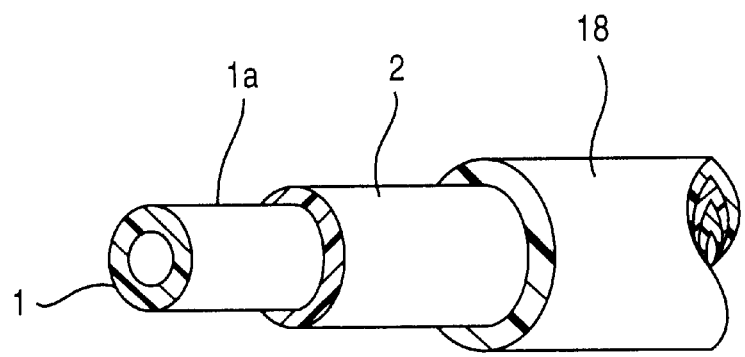
FIG. 2 is a view illustrating the structure of another embodiment of a fuel hose according to the present invention.

As shown in FIG. 2, another embodiment of the present invention comprises a tubular fluororesin inner layer 1, a thermoplastic resin intermediate layer 2 formed on a peripheral surface 1a of the tubular fluororesin inner layer 1 and an outer layer 18 of rubber (or thermoplastic elastomer) formed on a peripheral surface of the thermoplastic resin intermediate layer 2. The fuel hose having such an outer layer 18 is preferred for its high flame resistance and high resistance to chipping.

The material for forming a rubber outer layer 18 is not particularly limited. Examples thereof include epichlorohydrin rubber (CO), epichlorohydrin-ethylene oxide equimolar copolymer (ECO, alias CHC), acrylonitrile-butadiene copolymer rubber (NBR), NBR-polyvinyl chloride (PVC) blend rubber (NBR/PVC), chloroprene rubber (CR), chlorosulfonated polyethylene (CSM), chlorinated polyethylene (CPE), ethylene-propylene-diene rubber (EPDM), ethylene-propylene rubber (ESPM), NBR/EPDM blend rubber and fluorocarbon rubber (FKM). These may be used either alone or in combination. Among all, CO, ECO, NBR/PVC, CSM, EPDM and EFM are preferred for their high heat resistance and high ozone resistance. Further, the materials for forming a thermoplastic elastomer outer layer 18 are not particularly limited. Examples thereof include thermoplastic elastomers such as olefinic elastomers, polyvinyl chloride elastomers and urethane elastomers. The thickness of the outer layer 18 is generally within a range of 0.5 to 5.0 mm, preferably 0.5 to 3.0 mm.

Figure 3:
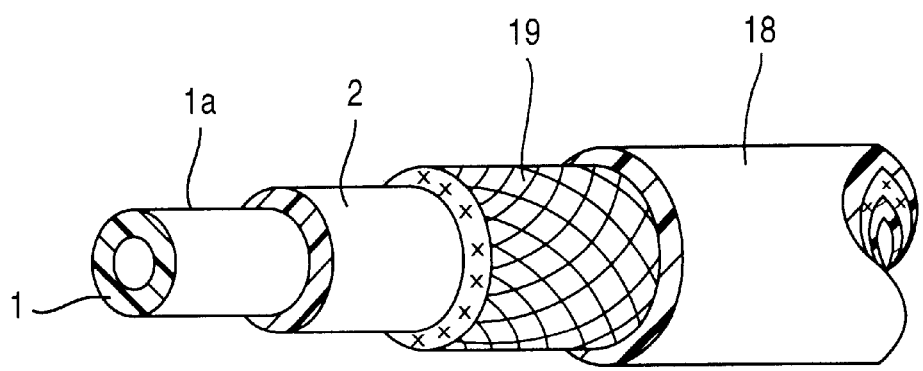
FIG. 3 is a view illustrating the structure of still another embodiment of a fuel hose according to the present invention.

As shown in FIG. 3, still another embodiment of the present invention comprises a tubular fluororesin inner layer 1, a thermoplastic resin intermediate layer 2 formed on a peripheral surface 1a of the tubular fluororesin inner layer 1, a reinforcing cord layer 19 formed on a peripheral surface of the thermoplastic resin intermediate layer 2 and an outer layer 19 of rubber (or thermoplastic elastomer) formed on a peripheral surface of the reinforcing cord layer 19. This fuel hose has the same structure as that of FIG. 2, except that the reinforcing cord layer 19 is installed between the thermoplastic resin intermediate layer 2 and the outer layer 18. Such a fuel hose containing the reinforcing, cord layer 19 is preferred for its superior pressure resistance. The reinforcing cord layer 19 is formed by braiding natural fiber such as linen or cotton, a synthetic yarn such as polyester yarn, vinylon yarn or nylon yarn, or metal filaments such as wires.

In addition, each of the tubular fluororesin inner layer 1 and the thermoplastic resin outer layer 2 of the fuel hose of the present invention is not particularly limited to a single-layer structure, as shown in FIGS. 1 to 3, respectively, and may have a multi-layer structure, For example, the tubular fluororesin inner layer 1 may have a two-layer structure wherein an inner layer is formed of conductive fluororesin and an outer layer is formed of non-conductive fluororesin. Alternatively, the tubular fluororesin inner layer 1 may have a two-layer structure wherein an inner layer is formed into a thin layer using a conductive fluororesin and an outer layer is formed of a non-conductive fluororesin.

Figure 4:
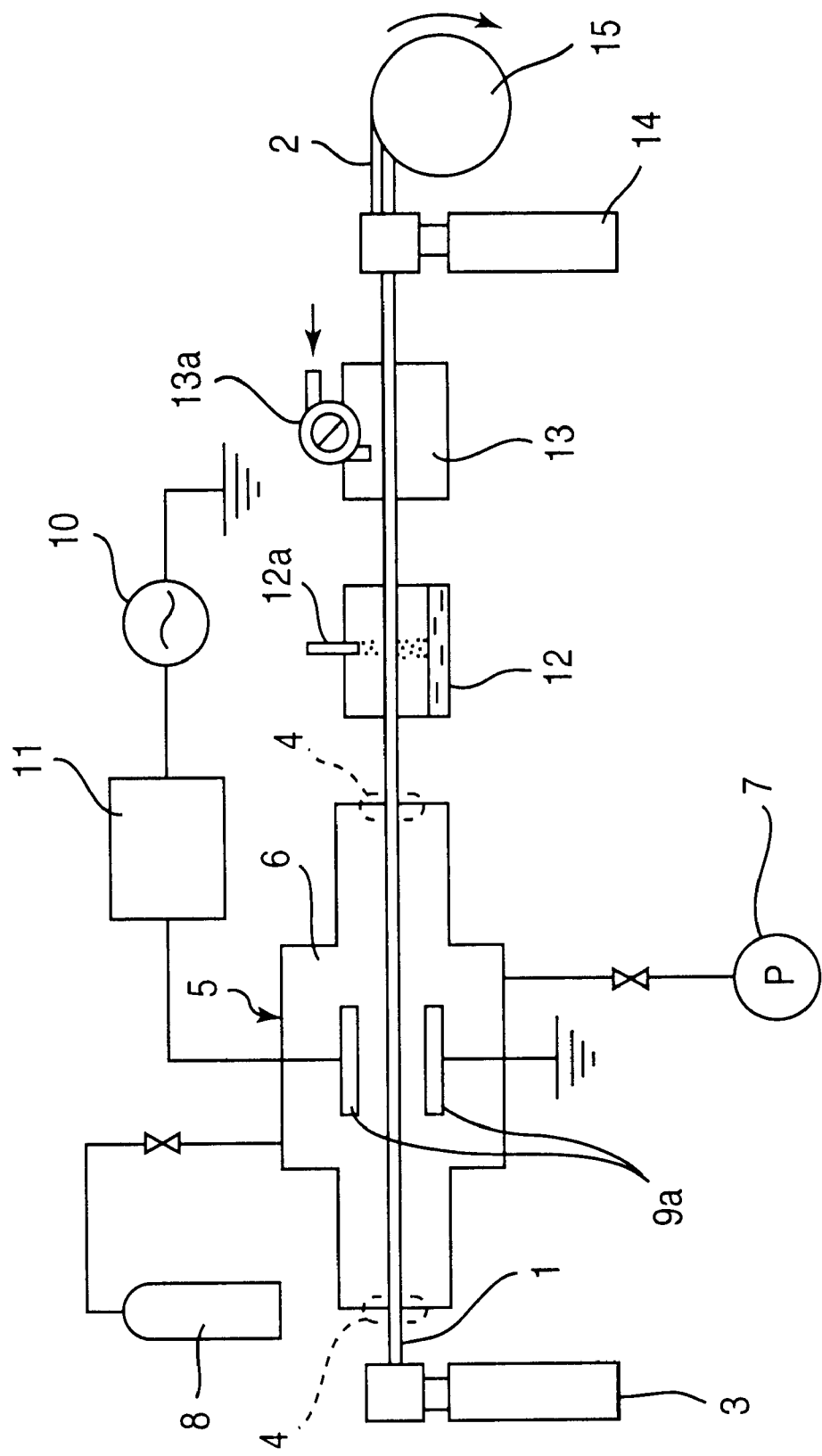
FIG. 4 is an explanatory view of one embodiment of a method of producing a fuel hose according to the present invention.

The fuel hose of the present invention may, for example, be produced by the following manner. First, the material (such as fluororesin) for forming the tubular fluororesin inner layer 1 is extruded by an inner layer extruder 3, for obtaining the tubular fluororesin inner layer 1, as shown in FIG. 4. The tubular fluororesin inner layer 1 is introduced in a reaction chamber 6 of a vacuum plasma apparatus 5 and is plasma-treated in a plasma treatment zone between electrodes 9a. The plasma-treated tubular fluororesin inner layer 1 is introduced in a treatment vessel 12 where water is dripped thereon by a nozzle 12a. Next, the thus treated tubular fluororesin inner layer is introduced in a treatment vessel 13 where excessive water is dried and eliminated by an air blowing apparatus 13a. Successively, the material (such as thermoplastic resin) for forming the thermoplastic resin outer layer 2 is extruded from an outer layer extruder 14 and the thermoplastic resin outer layer 2 is formed on a peripheral surface of the tubular fluororesin inner layer 1. Then, the thus obtained tube is wound up by a winder 15, for obtaining the intended fuel hose (as shown in FIG. 1). In addition, the fuel hose as the above (as shown in FIG. 1) can be obtained by dripping a silane coupling agent aqueous solution instead of water.

For establishing a stable plasma, the atmosphere in the reaction chamber 6 is evacuated by a vacuum pump 7, and then supplied with an electric discharge gas (containing Ar) by a gas supply apparatus 8. The reaction chamber 6 is maintained at a vacuum or reduced pressure (generally, 0.005 to 8 Torr). In the plasma treatment, an impedance-matched high-frequency, high-output current is applied to the electrodes 9a for a predetermined period by means of a high-frequency power source 10 and a matching, box 11 to induce an electric discharge between the electrodes and thereby ionize the electric discharge gas to create a plasma state. The frequency used is in the range of 0.1 to 1000 MHz, preferably 1 to 100 MHz. The output of the high-frequency power source 10 is generally within a range of 2 to 400 W, preferably 5 to 300 W. The treatment time is appropriately determined depending on the type and size of the fluororesin material but is generally 1 to 180 seconds, preferably 3 to 60 seconds. The vacuum plasma treatment is preferably a glow discharge plasma treatment using an Ar gas-containing atmosphere. Since this glow discharge plasma treatment does not require a high degree of vacuum, it is advantageous that the vacuum plasma apparatus to be used herein is not necessarily high performance but rather may be an ordinary apparatus.

The plasma treatment is carried out preferably at a sub-atmospheric or negative pressure. If seating effect of seals 4 of the vacuum plasma apparatus 5 is poor, it is difficult to control the degree of vacuum within the vacuum plasma apparatus 5 at a constant level so that a stable plasma cannot be generated For this, reason, the seals 4 are preferably formed of rubber elastomer. The rubber elastomer with a hardness of 45 to 80 (JIS A) is generally preferred. The kind of the rubber elastomer is not particularly limited, but good results are obtained by using silicone rubber or acrylonitrile-butadiene copolymer rubber (NBR).

Figure 5:
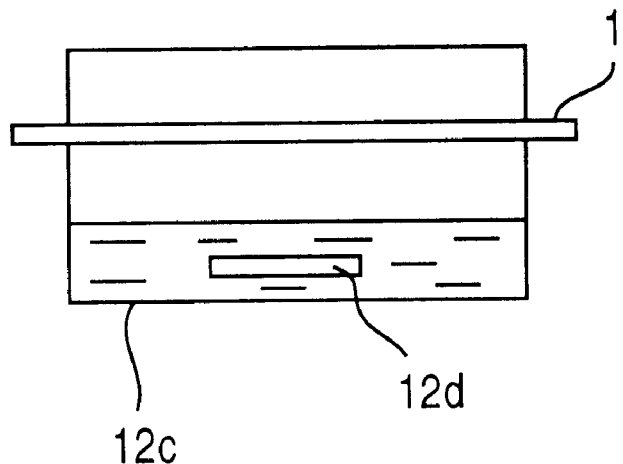
FIG. 5 is an explanatory view of another embodiment of the treatment vessel 12 of FIG. 4.

In the embodiment of FIG. 4, the water-dripping method is used, as described above, wherein water is dripped by the nozzle 12a in the treatment vessel 12. However, as shown in FIG. 5, the water treatment may be conducted by heating water using a heater 12d so as to be saturated in a vessel 12c and introducing the tubular fluororesin inner layer 1 in the vapor-saturated, high-temperature and high-humid vessel 12c. In this case, there is the advantage that water containing metal ions (such as tap water) can be used. This is because metal salts are not gasified, and sink and accumulate on the bottom of the treatment vessel 12 so as not to affect the water treatment to the tubular fluororesin inner layer 1.

Figure 6:
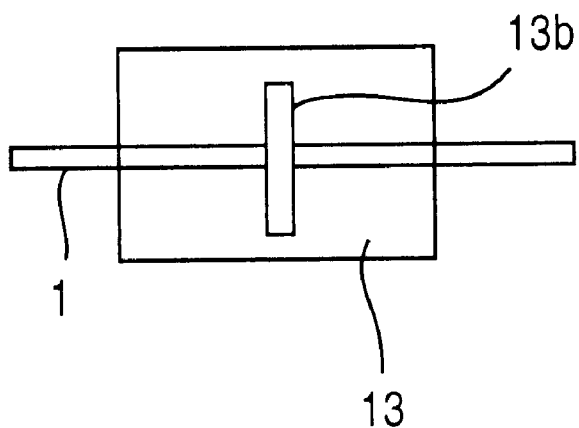
FIG. 6 is an explanatory view of another embodiment of the treatment vessel 13 of FIG. 4.

In the embodiment of FIG. 4, water is dried so as to be eliminated by the method using the air blower 13a in the treatment vessel 13. However, as shown in FIG. 6, excessive water can be eliminated by passing the tubular fluororesin inner layer 1 through a packing 13b installed in a production line.

Figure 7:
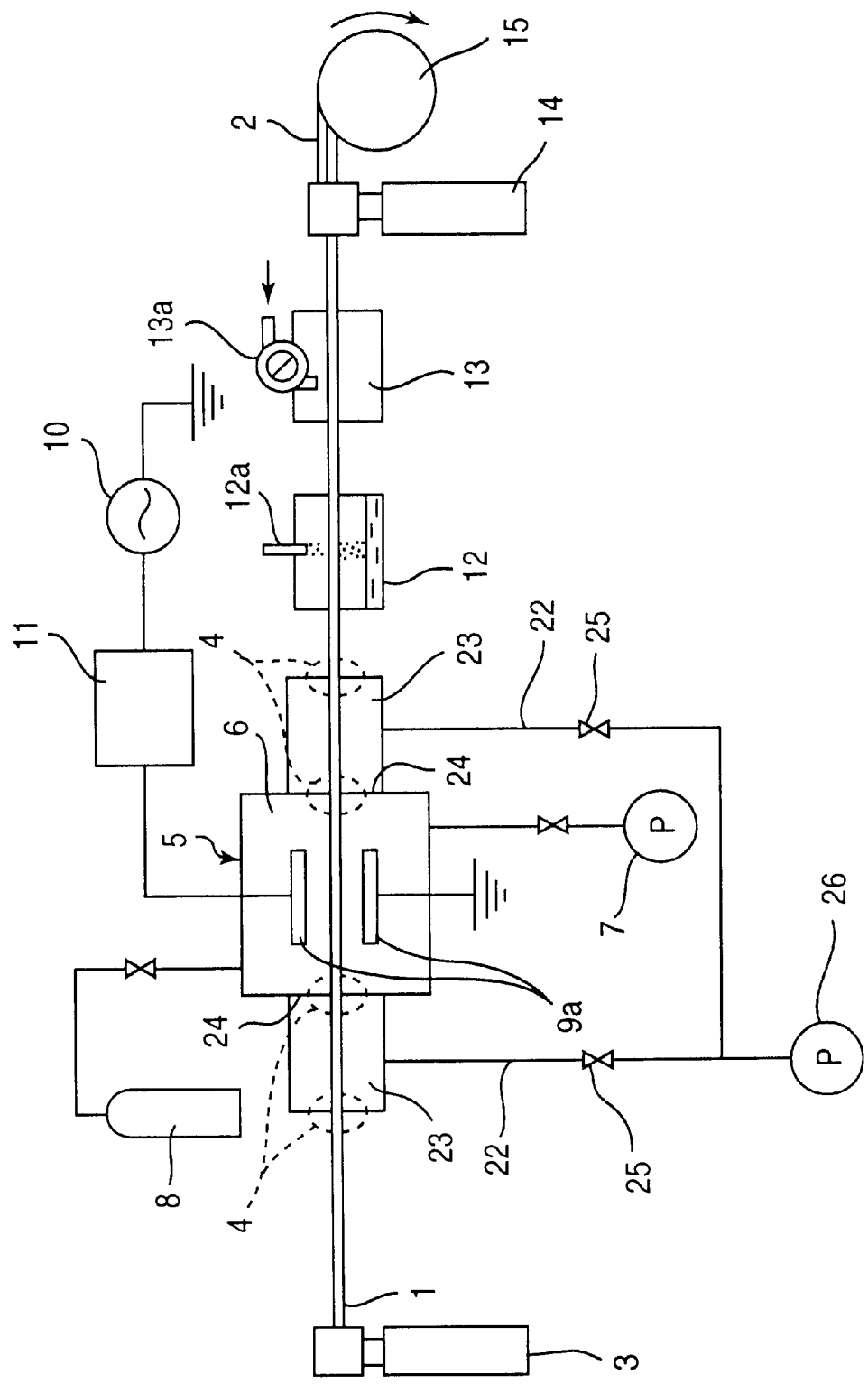
FIG. 7 is an explanatory view of one embodiment of a method using a vacuum plasma treatment apparatus having auxiliary vacuum chambers according to the present invention.
Figure 8:
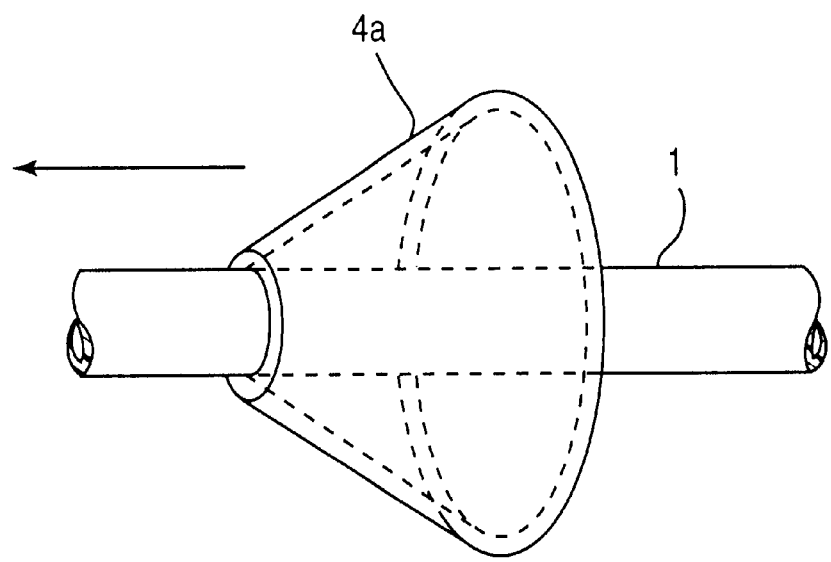
FIG. 8 is a view illustrating the structure of one embodiment of a sealed portion of the vacuum plasma treatment apparatus.
Figure 9:
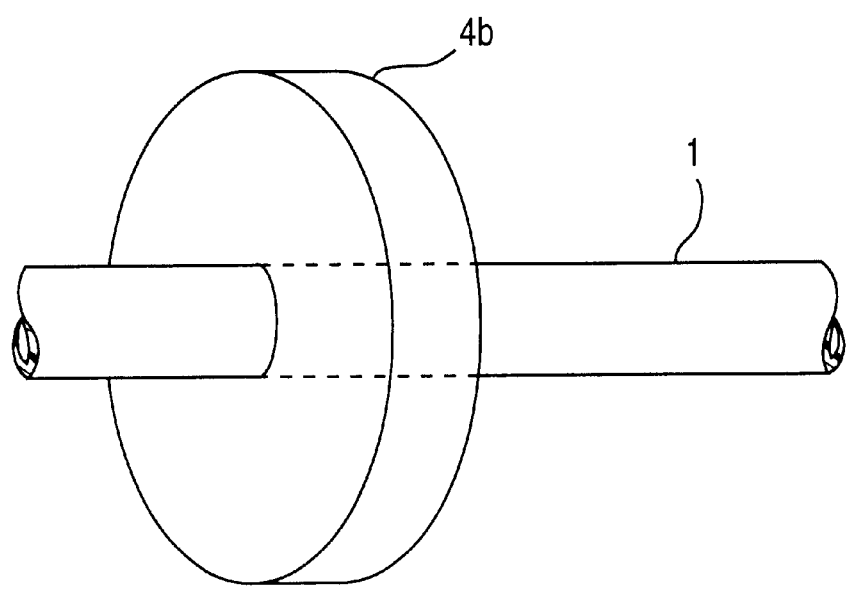
FIG. 9 is a view illustrating the structure of another embodiment of a sealed portion of the vacuum plasma treatment apparatus.

The configuration of the seal 4 is not particularly limited to a one-step structure, as shown in FIG. 4 and may have a two-step structure with auxiliary vacuum chambers 23. In FIG. 7, the same components as shown in FIG. 4 are denoted by the same reference numerals. Each auxiliary vacuum chamber 23 is separated from the reaction chamber 6 by a divider 24 and this auxiliary vacuum chamber 23 is communicated with a vacuum pump 26 via a line. 22. In the FIG. 7, the reference numerals 25 indicate valves installed in the line 22. The internal pressure within the auxiliary vacuum chamber 23 is moderately reduced (about 0.1 to 10 Torr) by the vacuum pump 26, as compared with the reaction chamber 6. With this provision of the auxiliary vacuum chambers 23, the entry of external air from the hose inlet and outlet into the vacuum plasma apparatus 5 can be completely prevented. As a result, the degree of vacuum within the reaction chamber 6 can be exactly controlled so as to ensure generation of a stable plasma. The configuration of the seal 4 is not particularly limited to the above-mentioned figures formed of rubber elastomer. The seal 4 may be a generally frustoconical seal 4a, as shown in FIG. 8. With this seal 4a, the area of contact with the tubular fluororesin inner layer 1 is reduced to lower the contact frictional force consequently, the tubular fluororesin inner layer 1 can be smoothly introduced into the vacuum plasma apparatus 5 and also the vacuum plasma apparatus 5 can be kept sufficiently air-tight. In FIG. 8, an arrow indicates the entry direction of advance of the tubular fluororesin inner layer 1. As an alternative, the seal may be a disk-shaped seal 4b as shown in FIG. 9, whereby the air-tightness of the vacuum plasma apparatus 5 is further enhanced.

Figure 10:
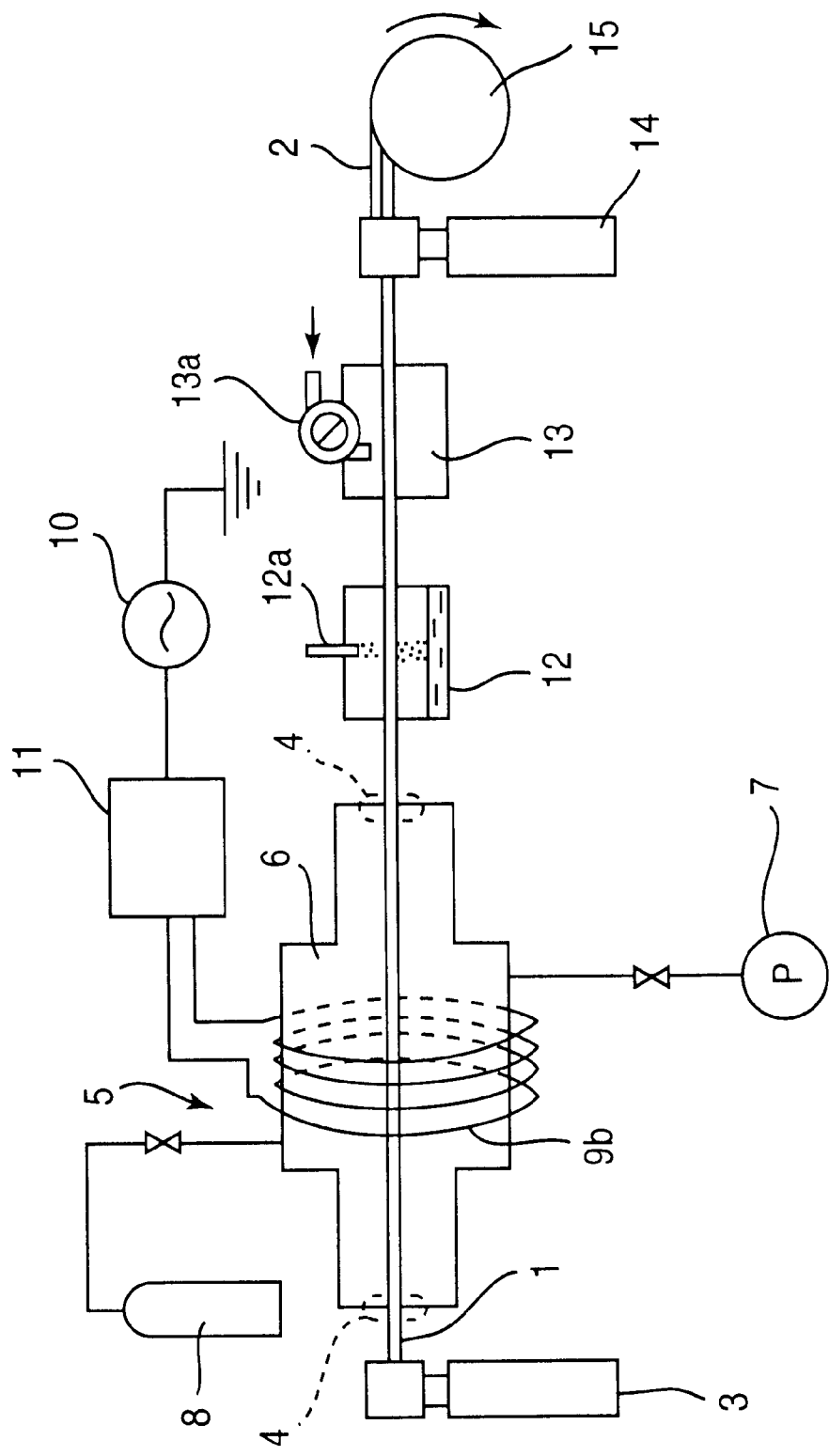
FIG. 10 is an explanatory view illustrating one embodiment of a method of producing a fuel hose according to the present invention by using a vacuum plasma treatment apparatus having an induction coil electrode means.

The plasma apparatus of the present invention is not particularly limited to the vacuum plasma apparatus 5, as shown in FIG. 4, having internal electrodes 9a, but may be an apparatus 5 provided with induction coil electrodes 9b on a periphery thereof as shown in FIG. 10. In FIG. 10, the same components as shown in FIG. 4 are denoted by the same reference numerals.

Figure 11:
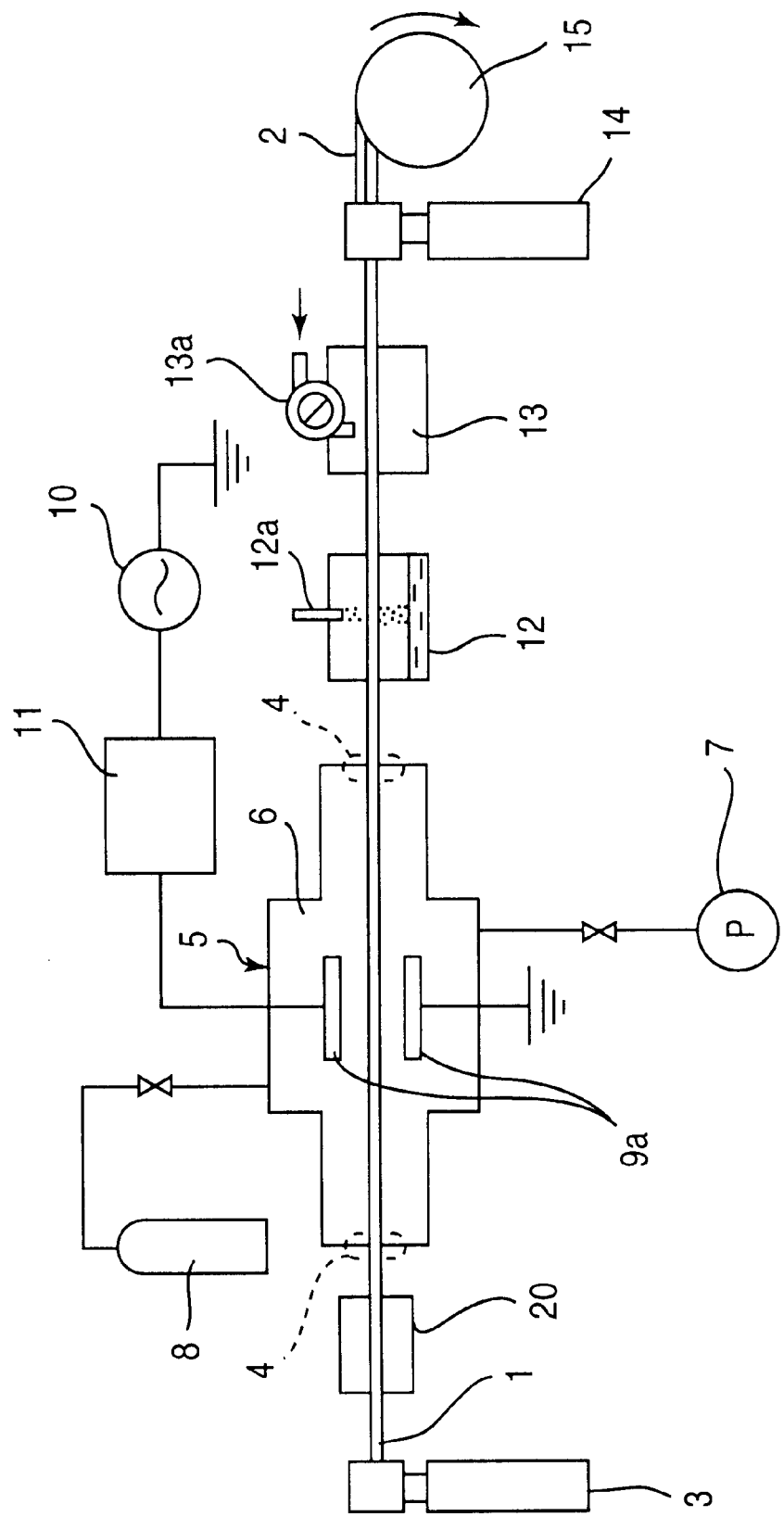
FIG. 11 is an explanatory view illustrating one embodiment of a method of producing a fuel hose according to the present invention wherein a cooling zone is installed.

It is preferred that the tubular fluororesin inner layer 1 is cooled by a cooling zone 20 provided soon after extrusion molding before it is introduced to the vacuum plasma apparatus 5 as shown in FIG. 11. This is because the tubular fluororesin inner layer just extruded is still hot and soft so that it has poor shape retentivity. It is also preferred that the thermoplastic resin outer layer 2 is cooled by a cooling zone (not shown) provided soon after extrusion molding due to the same reason. In FIG. 11, the same components as shown in FIG. 4 are denoted by the sane reference numerals.

Figure 12:
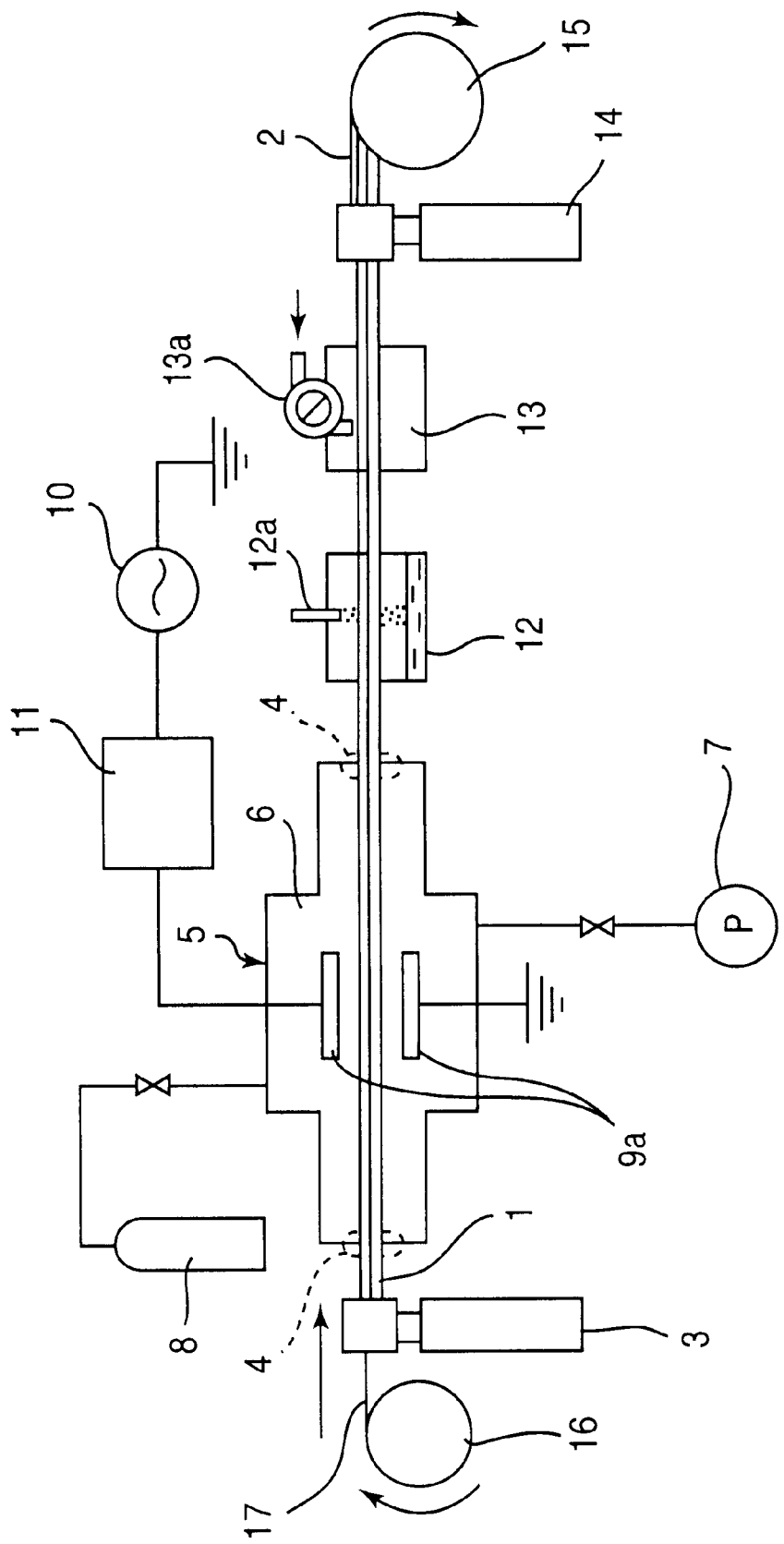
FIG. 12 is an explanatory view illustrating one embodiment of a method of producing a fuel hose according to the present invention by using a mandrel.

FIG. 4 illustrates the method of producing the fuel hose wherein a mandrel is not used, but the present invention is not particularly limited thereto. The fuel hose may be produced by supplying a mandrel 17 from a mandrel supplier 16 to an inner layer extruder 3 so that a tubular fluororesin inner layer 1 may be formed onto the mandrel 17 In FIG. 12, the construction is the same as in FIG. 4 except that the mandrel supplier 16 and the mandrel 17 are used, and the same components as shown in FIG. 4 are denoted by the same reference numerals.

In the above description of the procedure for producing a fuel hose, the five production stages of tubular inner layer molding, vacuum plasma treatment, water treatment (or silane coupling agent aqueous solution treatment), drying process and formation of a thermoplastic resin outer layer on the peripheral surface of the inner layer are continuously carried out, but the present invention is not particularly limited thereto. A typical alternative procedure comprises forming a tubular fluororesin inner layer 1 by extruding the material (such as a fluororesin) from the inner layer extruder 3, taking up thereof on a winder (not shown), paying out the tubular inner layer 1 from the winder to the vacuum plasma apparatus 5, the water treatment (or the silane coupling agent aqueous solution treatment), the drying process and holding a thermoplastic rein outer layer on the peripheral surface of the tubular fluororesin inner layer 1. There is the advantage by using such a partial batch process that the materials for the tubular fluororesin inner layer 1 and/or for the thermoplastic resin outer layer 2 can be easily changed for each production lot.

The fuel hoses as shown in FIG. 2 and 3 may be produced by a braiding process or an extrusion process with a braider or an extruder, for example, provided after the outer layer extruder 14 in FIG. 4.

The tubular fluororesin inner layer 1 of thus obtained fuel hose according to the present invention has generally an inner diameter of about 4 to 50 mm and a thickness of about 0.05 to 1 mm and the thermoplastic resin outer layer 2 has a thickness of 0.2 to 4 mm, preferably 0.5 to 3 mm.

In the fuel hose according to, the present invention, functional groups having oxygen atoms such as OH groups are distributed on the peripheral surface of the tubular fluororesin inner layer. Since the functional groups having oxygen atoms are involved in adhesion, the adhesion strength between the tubular fluororesin inner layer and the thermoplastic resin outer layer can be improved.

The fuel hose according to the present invention is provided with properties that a strength ratio of bond energy [I(286.5 eV)/I(292.2 eV)] of surface carbon, atoms (C1s) by analyzing the surface layer of the peripheral surface of the tubular fluororesin inner layer with an X-ray photo-electron spectroscopy (ESCA) is not less than 1.3 in the case that bond energy on a peak top of fluorine (F1s) is a standard value (689.63 eV) and metal ions are not distributed in the surface layer of the peripheral surface of the tubular fluororesin inner layer. Where the strength ratio of the bond energy is less than 1.3, the surface concentration of fluorine atoms not involved in adhesion is high on the peripheral surface of the tubular fluororesin inner layer so that adhesive strength between the tubular fluorine resin inner layer and the thermoplastic resin outer layer is insufficient. Further, where metal ions (such as $Na^+$, $C^{2+}$ and $Zn^{2+}$) are distributed on the surface layer of the tubular fluororesin inner layer, adhesive strength between the tubular fluorine resin inner layer and the thermoplastic resin outer layer is insufficient because the bond strength due to such as hydrogen bonds is prohibited by the metal ions. As such an example, it is known that nylon resin may crack due to an antifreezing agent (such as calcium chloride).

The analysis by the X-ray photo-electron spectroscopy (ESCA) is preferably using a photoelectron spectrometer (5600 Ci available from ULVAC-PHI, INC.) under the following measurement conditions.

Exciting X-rays: A1, $K\alpha_{1,2}$ rays (1486.6 eV)
X-ray output: 10 kV, 20 mA
Temperature: 20° C.
Degree of vacuum: $3 \times 10^{-8}$ Torr Examples will hereinafter be described along with Comparative Examples.

Prior to Examples and comparative Examples, the following silane coupling agents were prepared.

Silane Coupling Agent A

N-β (aminoethyl) γ-aminopropylmethyldimethoxysilane

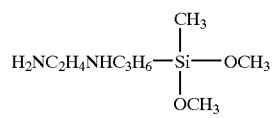

Silane Coupling Agent B

N-β (Aminoethyl) γ-aminopropyltriethoxysilane

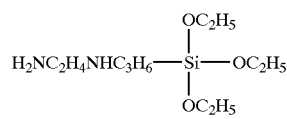

Silane Coupling Agent C

γ-aminopropyltrimethoxysilane

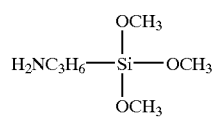

Silane Coupling Agent D

γ-aminopropyltriethoxysilane

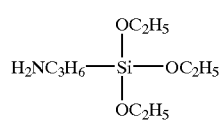

Silane Coupling Agent E

β-(3,4-epoxycyclohexyl)Ethyltrimethoxysilane

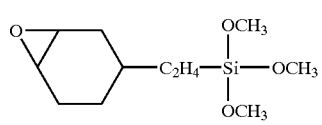

Silane Coupling Agent F

γ-glycidoxy Propyltrimethoxy Silane

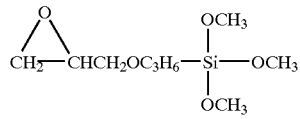

EXAMPLE 1

An ethylene-tetrafluoroethylene copolymer (ETFE) as a material for forming a tubular fluororesin inner layer and nylon 12 (PA12, content of a plasticizer: 5%) as a material for forming a thermoplastic resin outer layer were prepared, as shown in the following Table 1. As a treatment agent, pure water (pH=7) was also prepared. A fuel hose was produced in accordance with a manner shown in FIG. 4 by using these materials. In the thus obtained fuel hose, the tubular fluororesin inner layer had an inner diameter of 6.0 mm and a thickness of 0.25 mm and the thermoplastic resin outer layer had a thickness of 0.75 mm. The plasma treatment conditions were a frequency of 13.56 MHz and an output of 250 W. In addition, a reaction chamber 6 was evacuated by a vacuum pump 7 to $10^{-3}$ Torr, and then supplied with a gas containing Ar from a gas supplying apparatus 8 so that the reaction chamber 6 was under a reduced pressure of 0.07 Torr.

EXAMPLE 2

A fuel hose was produced in the same manner as EXAMPLE 1 except that a 0.1% by weight acetic aqueous acid solution (pH=4±0.2) was used, as shown in the following Table 1, instead of the pure water (pH=7) of EXAMPLE 1.

EXAMPLE 3

A fuel hose was produced in the same manner as EXAMPLE 1 except that an aqueous solution of 1% by weight silane coupling agent (A) in pure water (pH=7) was used, as shown in the following Table 2, instead of the pure water (pH=7) of EXAMPLE 1. In addition, the application amount (excluding aqueous solution) of the silane coupling agent was $3 \times 10^{-7}$ g/cm² based on a plasma-treated peripheral surface of the tubular fluororesin inner layer.

EXAMPLE 4

A fuel hose was produced in the same manner as EXAMPLE 3 except that the silane coupling agent (B) was used, as shown in the following Table 1, instead of the silane coupling agent (A) of EXAMPLE 3.

EXAMPLE 5

A fuel hose was produced in the same manner as EXAMPLE 3 except that the silane coupling agent (C) was used, as shown in the following Table 1, instead of the silane coupling agent (A) of EXAMPLE 3.

EXAMPLE 6

A fuel hose was produced in the same manner as EXAMPLE 3 except that the silane coupling agent (D) was used instead of the silane coupling agent (A) of EXAMPLE 3 and also nylon 11 (PA11) was used as a material for forming a thermoplastic resin outer layer instead of nylon 12

(PA12) of EXAMPLE 3, respectively, as shown in the following Table 1.

EXAMPLE 7

A fuel hose was produced in the same manner as EXAMPLE 3 except that an aqueous solution of 1% by weight silane coupling agent (E) in an acetic aqueous acid solution (pH=4±0.2) was used, as shown in the following Table 2, instead of the acetic aqueous acid solution of 1% by weight silane coupling agent (A) of EXAMPLE 3, as shown in the following Table 2.

EXAMPLE 8

A fuel hose was produced in the same manner as EXAMPLE 6 except that an aqueous solution of 1% by weight silane coupling agent (F) in an acetic aqueous acid solution (pH=4±0.2) was used, as shown in the following Table 2, instead of the aqueous solution of 1% by weight silane coupling agent (D) of EXAMPLE 6, as shown in the following Table 2.

EXAMPLE 9

A fuel hose was produced in the same manner as EXAMPLE 4 except that a tubular fluororesin inner layer had a two-layer structure of a conductive ETFE inner layer. (an inner diameter of 6.0 mm and a thickness of 0.10 mm) and an ETFE outer layer (a thickness of 0.15 mm), as shown in the following Table 2. The above conductive ETFE layer was formed by using a material wherein a conductive carbon black (Ketjen black EC available from Ketjen Black International Company) was mixed at 15% by weight to ETFE.

EXAMPLE 10

A fuel hose was produced in the same manner as EXAMPLE 4 except that conductive PA12 was used for forming a thermoplastic resin outer layer instead of nylon 12 (PA12) of EXAMPLE 4, the conductive PA12 having a conductive carbon black (Ketjen black EC available from Ketjen Black International Company) mixed at 13% by weight to PA12, as shown in the following Table 2,

EXAMPLE 11

A fuel hose was produced in the same manner as EXAMPLE 1 except that a tubular fluororesin inner layer was formed by using polyvinylidene fluoride (PVDF) and the tubular fluororesin inner layer was treated with an aqueous solution of 0.2% by weight silane coupling agent (B) in pure water (pH=7) and nylon 11 (PA11) was used for forming a thermoplastic resin outer layer, as shown in the following Table 2.

EXAMPLE 12

A fuel hose was produced in the same manner as EXAMPLE 1 except that a tubular fluororesin inner layer was formed by using a tetrafluoroethylene-hexafluoropropylene-vinylidene fluoride terpolymer (THV) and the tubular fluororesin inner layer was treated with an aqueous solution of 0.5% by weight silane coupling agent (D) in pure water (pH=7) and nylon 6 (PA6) was used for forming a thermoplastic resin outer layer, as shown in the following Table 2.

EXAMPLE 13

A fuel hose was produced in the same manner as EXAMPLE 9 except that a conductive carbon black (Denka black available from Denki Kagaku Kogyo K. K.) was used instead of the carbon black (Ketjen black EC available from Ketjen Black International Company).

COMPARATIVE EXAMPLE 1

A fuel hose was produced in the same manner as EXAMPLE 1 except that water treatment was not conducted, as shown in the following Table 3.

COMPARATIVE EXAMPLE 2

A fuel hose was produced in the same manner as EXAMPLE 11 except that treatment with silane coupling agent aqueous solution was not conducted, as shown in the following Table 3.

COMPARATIVE EXAMPLE 3

A fuel hose was produced in the same manner as EXAMPLE 1 except that plasma treatment was not conducted, as shown in the following Table 3.

COMPARATIVE EXAMPLE 4

Figure 13:
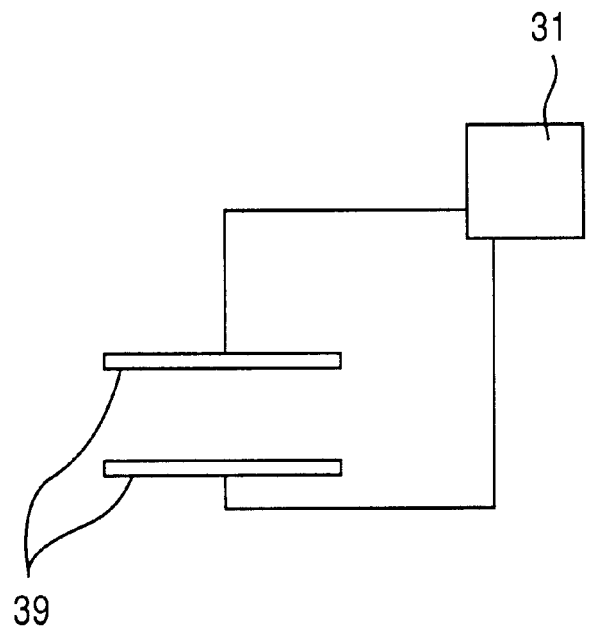
FIG. 13 is a view illustrating the structure of a corona discharge apparatus used for a method of producing a fuel hose of COMPARATIVE EXAMPLE.

A fuel hose was produced in the same manner as EXAMPLE 1 except that corona treatment was conducted instead of plasma treatment, as shown in the following Table 3. In addition, the corona treatment was conducted in the air by using an apparats shown in FIG. 13 with a frequency of 20 kHz and an output of 0.4 kw. In FIG. 13, there are shown a high-frequency power source 31 and electrodes 39.

COMPARATIVE EXAMPLES 5

A fuel hose was produced in the same manner as EXAMPLE 1 except that a solution of 20% by volume epoxy resin adhesive in ethanol (BX60 available from Toagosei Co., Ltd.) was used as a treatment agent, as shown in the following Table 3.

COMPARATIVE EXAMPLE 6

A fuel hose was produced in the same manner as EXAMPLE 1 except that a 1% by weight aqueous solution (pH=11) of sodium hydroxide was used as a treatment agent, as shown in the following Table 3.

COMPARATIVE EXAMPLE 7

A fuel hose was produced in the same manner as EXAMPLE 7 except that a solution of 3% by weight silane coupling agent (E) in ethanol was used as a treatment agent instead of the acetic aqueous acid solution of 1% by weight silane coupling agent (E) of EXAMPLE 7, as shown in the following Table 4.

COMPARATIVE EXAMPLE 8

A fuel hose was produced in the same manner as EXAMPLE 8 except that a solution of 3% by weight silane coupling agent (F) in ethanol was used as a treatment agent instead of the acetic aqueous acid solution of 3% by weight silane coupling agent (F) of EXAMPLE 8, as shown in the following Table 4.

For each of the above fuel hoses of the EXAMPLES and the COMPARATIVE EXAMPLES, each adhesive strength, at an initial stage, after immersion in gasoline and after heat aging was determined according to the following standards. These results are also shown in the following Tables 1 to 4. For each of the fuel hoses of EXAMPLES 1 and 2 and COMPARATIVE EXAMPLES 1 and 6, the treated surface of the tubular, fluororesin inner layer was analyzed by an X-ray photo-electron spectroscopy (ESCA). The results are shown in the following Tables 1 to 4 and FIGS. 15 and 16.

Initial Adhesive Strength

Figure 14:
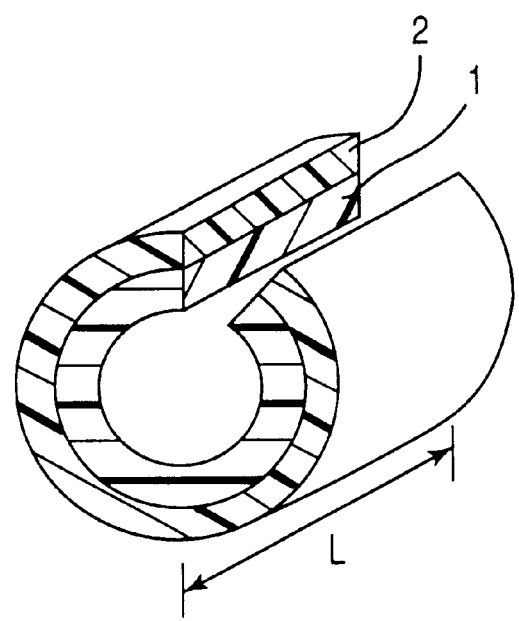
FIG. 14 is a view illustrating the structure of a test piece used for determination of adhesive strength of a fuel hose.

The initial adhesive strength was determined in accordance with JIS K 6301. Thus, as illustrated in FIG. 14, each fuel hose was sliced into a 10 mm-long ring which was then cut in the longitudinal direction to prepare a test sample. The tubular fluororesin inner layer 1 and the thermoplastic resin outer layer 2 of this sample were partially peeled off from the section and the peeled ends were secured stationary with the jig of a tensile tester and a tensile test was performed at a peeling speed of 25 mm/min. The load found from this tensile test was regarded as the initial adhesive strength between the two layers.

Adhesive Strength After Immersion in Gasoline

The test piece prepared in the same manner as the above determination of the initial adhesive strength was immersed in gasoline (Fuel C) at 40° C. for 168 hours and the adhesive strength between the tubular fluororesin inner layer 1 and the thermoplastic resin outer layer 2 was determined in the same manner as described above.

Adhesive Strength After Heat Aging

The test piece prepared in the same manner as the above determination of the initial adhesive strength was heat-treated at 125° C. for 240 hours and the adhesive strength between the tubular fluororesin inner layer 1 and the thermoplastic resin outer layer 2 was determined in the same manner as described above.

ESCA Analysis

The treated surface (peripheral surface) of the tubular fluororesin inner layer of the fuel hose was analyzed by using an X-ray photo-electron spectroscopy (5600 Ci available from ULVAC-PHI, INC.) under the following conditions. In addition, the tubular fluororesin inner layer was preserved under reduced pressure immediately after the predetermined surface treatment and was immediately subject to this analysis in order to prevent effects from the atmosphere (the air or moisture) from the surface treatment process (plasma treatment or plasma treatment+water treatment) on the tubular fluororesin inner layer to the coating process on the thermoplastic resin outer layer.

Exciting X-rays: Al, $K\alpha_{1,2}$ rays (1486.6 eV9)

X-ray output: 10 kV, 20 mA

Temperature: 20° C.

Degree of vacuum: $3 \times 10^{-8}$ Torr

TABLE 1

| | EXAMPLES | | | | | |
|---|---|---|---|---|---|---|
| | 1 | 2 | 3 | 4 | 5 | 6 |
| Tubular fluororesin inner layer | ETFE | ETFE | ETFE | ETFE | ETFE | ETFE |
| Surface treatment | plasma treatment | plasma treatment | plasma treatment | plasma treatment | plasma treatment | plasma treatment |
| Treatment agent | | | | | | |
| Silane coupling agent | pure water | acetic acid | A | B | C | D |
| Solvent | (pH = 7) | solution | pure water | pure water | pure water | pure water |
| Concentration (% by weight) | | | 1 | 1 | 1 | 1 |
| Thermoplastic resin outer layer | PA12 | PA12 | PA12 | PA12 | PA12 | PA11 |
| Adhesive strength (N/mm) | | | | | | |
| At an initial stage | 3.5 | 4.0 | 4.0 | 3.5 | 3.5 | 3.6 |
| After immersion in gasoline | 3.0 | 3.2 | 3.1 | 3.1 | 3.3 | 3.3 |
| After heat aging | 3.0 | 2.9 | 3.3 | 3.3 | 3.2 | 3.3 |
| ESCA analysis I(286.5 eV)/I(292.2 eV) | 2.0 | 2.3 | — | — | — | — |

TABLE 2

| | EXAMPLES | | | | | | |
|---|---|---|---|---|---|---|---|
| | 7 | 8 | 9 | 10 | 11 | 12 | 13 |
| Tubular fluororesin inner layer | ETFE | ETFE | c-ETFE/ETFE | ETFE | PVDF | THV | c-ETFE/ETFE |
| Surface treatment | plasma treatment | plasma treatment | plasma treatment | plasma treatment | plamsa treatment | plasma treatment | plasma treatment |
| Treatment agent | | | | | | | |
| Silane coupling agent | E | F | B | B | B | D | B |

TABLE 2-continued

| | EXAMPLES | | | | | | |
|---|---|---|---|---|---|---|---|
| | 7 | 8 | 9 | 10 | 11 | 12 | 13 |
| Solvent | acetic acid | acetic acid | pure water | pure water | pure water | pure water | pure water |
| Concentration (% by weight) | 1 | 1 | 1 | 1 | 0.2 | 5 | 1 |
| Thermoplastic resin outer layer | PA12 | PA11 | PA12 | c-PA12 | PA11 | PA6 | PA12 |
| Adhesive strength (N/mm) | | | | | | | |
| At an initial stage | 3.8 | 3.8 | 4.0 | 3.7 | 3.8 | material rupture * | 4.0 |
| After immersion in gasoline | 3.3 | 3.2 | 3.1 | 3.1 | 3.0 | material rupture * | 3.1 |
| After heat aging | 3.3 | 3.4 | 3.3 | 3.1 | 3.3 | material rupture * | 3.3 |
| ESCA analysis I(286.5 eV/I(292.2 eV) | — | — | — | — | — | — | — |

* The tubular fluororesin inner layer ruptured since adhesion was strong.

TABLE 3

| | COMPARATIVE EXAMPLES | | | | | |
|---|---|---|---|---|---|---|
| | 1 | 2 | 3 | 4 | 5 | 6 |
| Tubular fluororesin inner layer | ETFE | PVDF | ETFE | ETFE | ETFE | ETFE |
| Surface treatment | plasma treatment | plasma treatment | — | corona treatment | plasma treatment | plasma treatment |
| Treatment agent | — | — | pure water (pH = 7) | pure water (pH = 7) | epoxy resin adhesive | NaOH aqueous solution (pH = 11) |
| Thermoplastic resin outer layer | PA12 | PA11 | PA12 | PA12 | PA12 | PA12 |
| Adhesive strength (N/mm) | | | | | | |
| At an initial stage | 3.5 | 3.6 | 0.1 | 1.3 | 2.0 | 1.7 |
| After immersion in gasoline | 2.5 | 2.4 | 0 | 0.7 | 1.7 | 0.4 |
| After heat aging | 2.6 | 2.6 | 0 | 1.1 | 1.8 | 1.3 |
| ESCA analysis I(286.5 eV)/I(292.2 eV) | 0.9 | — | — | — | — | 2.2 (Na detected) |

TABLE 4

| | COMPARATIVE EXAMPLES | |
|---|---|---|
| | 7 | 8 |
| Tubular fluororesin inner layer | ETFE | ETFE |
| Surface treatment | plasma treatment | plasma treatment |
| Treatment agent | | |
| Silane coupling agent | E | F |
| Solvent | ethanol | ethanol |
| Concentration (% by weight) | 3 | 3 |
| Thermoplastic resin outer layer | PA12 | PA11 |
| Adhesive strength (N/mm) | | |
| At an initial stage | 3.7 | 3.7 |
| After immersion in gasoline | 3.0 | 2.9 |
| After heat aging | 3.2 | 3.2 |
| ESCA analysis I (286.5eV)/I (292.2eV) | — | — |

Figure 15:
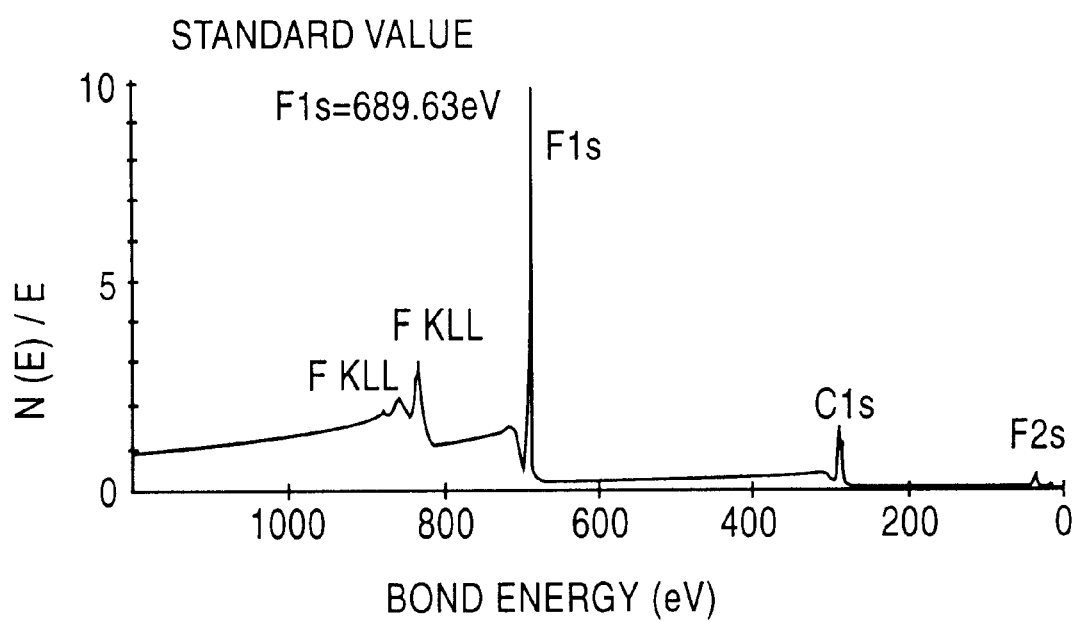
FIG. 15 is a chart of data by ESCA analysis on a peripheral surface of a tubular fluororesin inner layer.
Figure 16A:
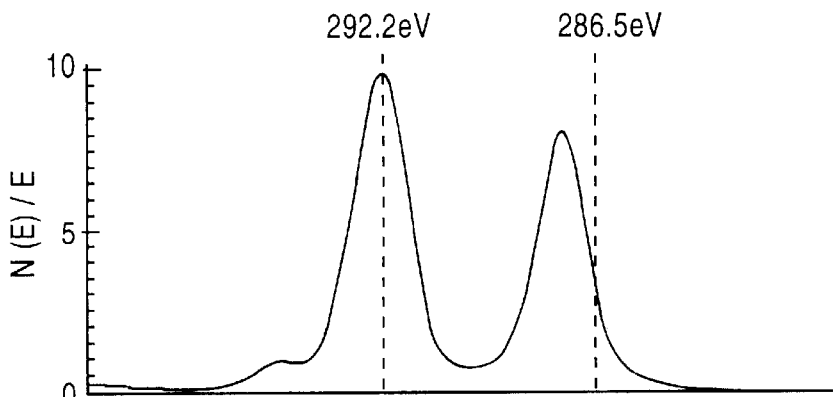
FIG. 16 is a chart of data by ESCA analysis on a peripheral surface of a tubular fluororesin inner layer.
Figure 16B:
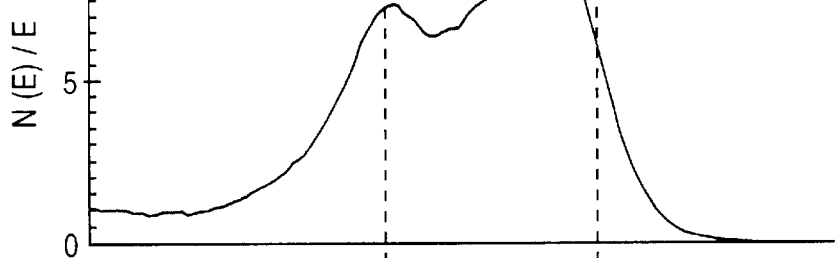
Figure 16C:
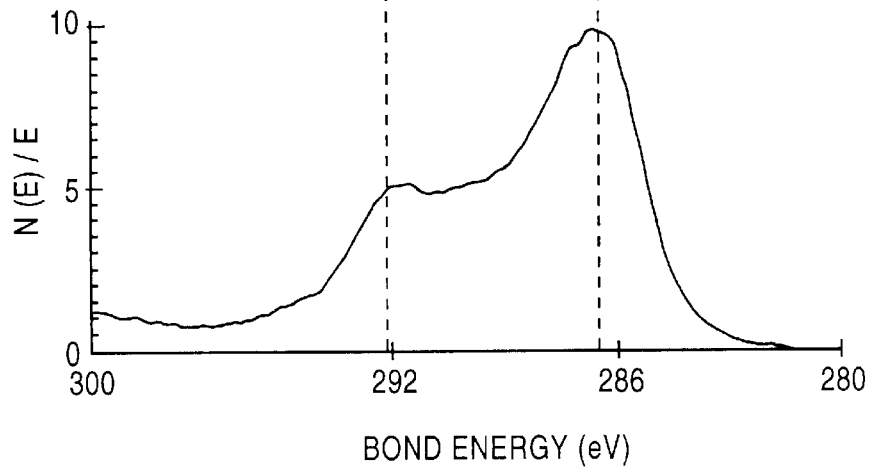

As can be understood from the results of the above Tables 1 to 4, each fuel hose of the EXAMPLES had sufficient adhesive reliability since initial adhesive strength was excellent and also deterioration in adhesive strength after immersion in gasoline and after heat aging was restrained. As can be understood from the results of ESCA analysis, each fuel hose of EXAMPLES 1 and 2 had a strength ratio of bond energy [I(286.5 eV)/I(292.2 eV)] of not less than 1.3. FIG. 15 is a chart for data when bond energy of fluorine (F1s) at a peak top is a standard value (689.63 eV). FIG. 16(a) shows a chart for data of a sample without plasma treatment, FIG. 16(b) shows a chart for data of a sample conducted with plasma treatment (COMPARATIVE EXAMPLE 1) and FIG. 16(c) shows a chart for data of a sample conducted with plasma treatment and water treatment (EXAMPLE 1). Comparing FIG. 16(a) with FIG. 16(b), the strength peak at 292.2 eV due to $CF_2$ groups in bond energy strength of surface carbon atoms (C1s) decreased because of elimination of fluorine atoms by plasma treatment so that the surface concentration of fluorine atoms decreased. Comparing FIG. 16(b) with FIG. 16(c), the surface concentration of fluorine atoms further decreased by conducting water treatment after plasma treatment and a peak (286.5 eV) due to $CH_2$ groups shifted to a low energy side. It is thought that the functional groups having fluorine atoms not involved in adhesion go inside the tubular fluororesin inner layer by conducting water treatment on the plasma-treated peripheral surface so that the surface concentration of fluorine atoms is decreased on the peripheral surface of the tubular fluororesin inner layer and adhesive functional groups (functional groups having oxygen atoms) such as an OH group is increased.

On the other hand, each fuel hose of COMPARATIVE EXAMPLES 1 and 2 was treated with neither water nor silane coupling agent aqueous solution after plasma treatment and therefore was inferior in each adhesive strength after immersion in gasoline and after heat aging. From the results of ESCA analysis, the fuel hose of COMPARATIVE EXAMPLE 1 had a strength ratio of bond energy [I(286.5 eV)/I(292.2 eV)] of not more than 1.3. The fuel hose of COMPARATIVE EXAMPLE 3 was remarkably inferior in initial adhesive strength since plasma treatment was not conducted, resulting in each adhesive strength of 0 (N/mm) after immersion in gasoline and heat aging. The fuel hose of COMPARATIVE EXAMPLE 4 was inferior in initial adhesive strength since corona treatment was conducted without plasma treatment, resulting in an inferior adhesive strength after immersion in gasoline and after heat aging. The fuel hose of COMPARATIVE EXAMPLE 5 was remarkably inferior in an adhesive strength after immersion in gasoline and after heat aging since it was treated with epoxy resin adhesive, resulting in inferior adhesive reliability. In the fuel hose of COMPARATIVE EXAMPLE 6, functional groups having oxygen atoms increased as well as EXAMPLE 1 where water treatment was conducted, but initial adhesive strength was inferior and adhesive strengths after immersion in gasoline and after heat aging were inferior since it was conducted with a sodium hydroxide aqueous solution. It is thought that the bond strength due to such as hydrogen bonds is prohibited by sodium ions and the strength of the thermoplastic resin outer layer was decreased also by sodium ions. As such an example, it is known that nylon resin may crack due to an antifreezing agent (such as calcium chloride). In addition, the adhesive strengths at an initial stage and also after immersion in gasoline and heat aging of the fuel hose of COMPARATIVE EXAMPLE 7 where an ethanol solution of the silane coupling agent was used were slightly inferior as compared with the fuel hose of EXAMPLE 7 where an acetic aqueous acid solution of the silane coupling agent was used. Similarly, the adhesive strengths at an initial stage and also after immersion in gasoline and heat aging of the fuel hose of COMPARATIVE EXAMPLE 8 where an ethanol solution of the silane coupling agent was used were slightly inferior as compared with the fuel hose of EXAMPLE 8 where an acetic aqueous acid solution of the silane coupling agent was used. Further, for preparation of each fuel hose of COMPARATIVE EXAMPLES 7 and 8, the organic solvent such as ethanol was used for diluting the silane coupling agent. Thus, concerns are expected about adverse effects on a working environment and a global environment due to transpiration of an organic solvent in the atmosphere. Further, special equipment for combustible materials is required, which is inferior in workability.

EFFECT OF THE INVENTION

As described above, the fuel hose of the present invention can be obtained by plasma-treating the surface of the tubular fluororesin inner layer, conducting at least one of water treatment and silane coupling agent aqueous solution treatment on the plasma-treated peripheral surface and forming the thermoplastic resin outer layer on the treated peripheral surface. Thus, the functional groups having fluorine atoms not involved in adhesion go inside the tubular fluororesin inner layer by conducting the at least one treatment on the plasma-treated peripheral surface so that the surface concentration of fluorine atoms is decreased on the peripheral surface of the tubular fluororesin inner layer and adhesive functional groups (functional groups having oxygen atoms) such as an OH group are widely distributed therein. As a result, the adhesive strength between the tubular fluororesin inner layer and the thermoplastic resin outer layer is improved so that deterioration in adhesive strength after heat aging and immersion into fuel can be restrained under severe conditions such as an inside of an engine compartment, for obtaining a fuel hose superior in adhesive reliability. Especially, where the silane coupling agent aqueous solution treatment is conducted on the peripheral surface of the plasma-treated peripheral surface, a silane coupling agent layer can be formed on the surface of the tubular fluororesin inner layer so that the adhesive strength between the tubular fluororesin inner layer and the silane coupling agent layer, and between the silane coupling agent layer and the thermoplastic resin outer layer, can be further enhanced.

Where the water treatment is conducted by using an aqueous acid solution, sufficient adhesive strength after heat aging and immersion into fuel can be obtained so that a fuel hose further superior in adhesive reliability can be produced. Where a hydrogen exponent (pH) of the aqueous acid solution is 2 to 6, a fuel hose even further superior in adhesive reliability can be produced.

Where the silane coupling agent is an amino silane coupling agent represented by the above-mentioned general formula (1), stability of the silane coupling agent aqueous solution is improved. Where the concentration of the silane coupling agent is not more than 10% by weight of a total amount of the aqueous solution, it becomes easy to treat the plasma-treated peripheral surface with silane coupling agent.

Where a hydrogen exponent (pH) of the acid silane coupling agent aqueous solution is 2 to 6, sufficient adhesive strength after heat aging and immersion into fuel can be obtained, resulting in superior adhesive reliability where the silane coupling agent is an epoxy silane coupling agent represented by the above-mentioned general formula (2), stability of the silane coupling agent aqueous acid solution is improved. Where the concentration of the silane coupling agent is not more than 10% by weight of a total amount of the aqueous acid solution, it becomes easy to treat the plasma-treated peripheral surface with silane coupling agent acid solution.

In addition, since silane coupling agents are flammable, a special installation for combustible materials is required for use thereof. For this reason, a silane coupling agnet is generally diluted with an organic solvent such as alcohol for use, which, however, may cause adverse effects on a working environment and a global environment due to transpiration of an organic solvent in the atmosphere. According to the present invention where the silane coupling agent aqueous solution diluted with water or silane coupling agents is used without organic solvents such as alcohols, a special installation for combustible materials is not necessary, thereby obtaining superior safety because of no fear about fire, improved workability and prevention of air pollution.

What is claimed is:

1. A method of producing a fuel hose comprising plasma-treating a peripheral surface of a tubular fluororesin inner layer, treating a surface layer of the plasma-treated peripheral surface with water and forming a polyamide resin outer layer on the treated peripheral surface.

2. A method of producing a fuel hose comprising plasma-treating a peripheral surface of a tubular fluororesin Inner layer, treating a surface layer of the plasma-treated peripheral surface with aqueous acid solution having a pH of 2 to 6 and forming a thermoplastic resin outer layer on the treated peripheral surface.

3. The method according to claim 1, wherein the tubular fluororesin inner layer includes an ethylene-tetrafluoroethylene copolymer.

4. The method according to claim 1, wherein the tubular fluororesin inner layer comprises at least two layers of which an innermost layer includes a conductive fluororesin and an outermost layer includes a non-conductive fluororesin.

5. The fuel hose produced by the method according to claim 1, wherein a functional group containing an oxygen atom is distributed in a surface layer of the peripheral surface of the tubular fluororesin inner layer.

6. The fuel hose according to claim 5, wherein a strength ratio of bond energy [(286.5 eV)/I(292.2 eV)] of surface carbon atoms (C1s) by analyzing the surface layer of the peripheral surface of the tubular fluororesin inner layer by means of an X-ray photo-electron spectroscopy (ESCA) is not less than 1.3 in the case that bond energy on a peak top of fluorine (F1s) is a standard value (689.63 eV) and metal ions are not distributed in the surface layer of the peripheral surface of the tubular fluororesin inner layer.

7. The fuel hose produced by the method according to claim 1, comprising a tubular fluororesin inner layer and a polyamide resin outer layer formed on a peripheral surface of the tubular fluororesin wherein the tubular fluororesin inner layer comprises a two-layer structure of an inner layer of conductive fluororesin and an outer layer of non-conductive fluororesin.

8. The fuel hose according to claim 7, wherein a rubber layer or a thermoplastic elastomer layer is on a peripheral surface of the polyamide resin outer layer.

* * * * *